United States Patent
Bassam Sinokrot (10) Patent No.: US 12,279,605 B2
(45) Date of Patent: Apr. 22, 2025

(54) APPARATUS AND METHOD FOR THE DETECTION OF WOOD BORING PESTS

(71) Applicant: Zeid Bassam Sinokrot, Amman (JO)

(72) Inventor: Zeid Bassam Sinokrot, Amman (JO)

( * ) Notice: Subject to any disclaimer, the term of this patent is extended or adjusted under 35 U.S.C. 154(b) by 262 days.

(21) Appl. No.: 18/022,434

(22) PCT Filed: Aug. 19, 2021

(86) PCT No.: PCT/IB2021/057640
§ 371 (c)(1),
(2) Date: Feb. 21, 2023

(87) PCT Pub. No.: WO2022/038558
PCT Pub. Date: Feb. 24, 2022

(65) Prior Publication Data
US 2023/0329212 A1    Oct. 19, 2023

Related U.S. Application Data

(60) Provisional application No. 63/068,493, filed on Aug. 21, 2020.

(51) Int. Cl.
*G08B 23/00* (2006.01)
*A01M 1/02* (2006.01)
*H04R 1/08* (2006.01)

(52) U.S. Cl.
CPC .............. *A01M 1/026* (2013.01); *H04R 1/08* (2013.01)

(58) Field of Classification Search
CPC ......... A01M 1/026; H04R 1/08; H04R 1/083; H04R 2430/03; H04R 1/46;
(Continued)

(56) References Cited

U.S. PATENT DOCUMENTS 5,832,658 A * 11/1998 Randon ............... A01M 1/2044
  43/132.1
6,883,375 B2 * 4/2005 Dunegan ............ G01N 29/2462
  73/587
(Continued)

FOREIGN PATENT DOCUMENTS

CN      109068596 A    12/2018
WO    2017/079052 A1    5/2017

OTHER PUBLICATIONS

International Preliminary Report on Patentability dated Jul. 25, 2023 issued in International Application No. PCT/IB2021/057640.
(Continued)

*Primary Examiner* — Toan N Pham
(74) *Attorney, Agent, or Firm* — Sughrue Mion, PLLC (57) ABSTRACT

An apparatus is used to detect insect infestations within a tree. The apparatus is used to insert a needle of a microphone housing within the tree. The microphone housing includes a microphone coupled to the needle. The microphone monitors an audio window. Within the audio window a plurality of overlapping audio sub-windows are detected. A mel spectrogram is calculated from the plurality of overlapping audio sub-windows where the mel spectrogram includes a matrix of features. A neural network determines if each of the plurality of overlapping sub-audio windows includes an indication of an insect being present and determines if the indications of an insect being present of the plurality of overlapping audio sub-windows indicates that the tree has an insect infestation.

16 Claims, 9 Drawing Sheets

(58) Field of Classification Search
CPC ....... G01N 29/4454; G01N 2291/0238; G01N 2291/02466; G01N 29/14; G01N 29/4481; G01N 29/46; G06N 3/04; G06N 3/08

See application file for complete search history.

(56) References Cited

U.S. PATENT DOCUMENTS

| | | | |
|---|---|---|---|
| 7,597,003 B2* | 10/2009 | Hawwa ................. | G01N 29/14 |
| | | | 73/571 |
| 9,489,824 B2* | 11/2016 | Osseiran .............. | A01M 1/2011 |
| 10,765,109 B1* | 9/2020 | Dev ........................ | A01G 7/06 |
| 11,324,210 B2* | 5/2022 | Ben Hamozeg ...... | A01M 1/026 |
| 2006/0028345 A1 | 2/2006 | Lee | |
| 2012/0224741 A1 | 9/2012 | Edwards | |

OTHER PUBLICATIONS

Chapter II Demand, dated Jun. 20, 2022 in International Patent Application No. PCT/IB2021/057640.
International Search Report for PCT/IB21/57640 dated Nov. 22, 2021.
Written Opinion for PCT/IB21/57640 dated Nov. 22, 2021.

* cited by examiner

APPARATUS AND METHOD FOR THE DETECTION OF WOOD BORING PESTS

CROSS-REFERENCE TO RELATED APPLICATIONS

This application is a National Stage of International Application No. PCT/IB2021/057640 filed Aug. 19, 2021, and claims the benefit of priority to U.S. provisional patent application Ser. No. 63/068,493 entitled "A SYSTEM AND SOFTWARE ALGORITHM FOR THE DETECTION OF THE RED PALM WEEVIL LARVAE INSIDE A PALM TREE BARK" filed Aug. 21, 2020, all of which are hereby incorporated by reference in their entirety.

FIELD OF THE INVENTION

The present invention pertains to the field of agroforestry, and in particular to the field of monitoring trees to monitor and detect the presence of harmful insects in trees.

BACKGROUND

The Red Palm Weevil (RPW) is a major invasive pest affecting approximately 40 species of palm trees around the world, including date, palm oil, and coconut trees. The pest is extremely difficult to detect in the early stage of infestation and infected trees show few externally visible signs of infection. Once an infestation becomes visible, it becomes too late to save an infected tree. The RPW has been detected in more than 60 countries and causes significant economic losses in those countries. Large economic investments are required to prevent and control RPW infestations.

A number of techniques have been used to detect RPW infestations at an early stage. Medical stethoscopes have been used to listen for telltales RPW sounds, however this approach is labor and time intensive and requires human operators with a high degree of expertise. Fixed sensors have been attached to individual trees; however, this approach has a high cost and is highly invasive as it requires drilling a hole into each tree and the results of the infestation are not apparent until after 3-5 days of monitoring.

Therefore, there is a need for an improved method and apparatus for real-time, automatic detection of RPW infestations at an early stage that overcomes the shortcomings of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an automatic portable device for the early detection of the red palm weevil (RPW) infestations in palm trees through the detection of RPW sound signatures. Embodiments include an apparatus including a housing and needle system to enable a microphone to monitor sound within trees. Sound recordings are assessed with a trained deep learning model to detect RPWs.

In accordance with embodiments of the present invention, there is provided an apparatus for monitoring sounds from within a tree. The apparatus includes a microphone housing including a needle coupled to a piezoelectric microphone for recording a sound detected by the needle while inserted within the tree. The apparatus also includes a processing unit coupled to the microphone housing. The processing unit includes a processor and a memory for storing computer readable instruction that when executed by the processor cause the processor to perform a method.

The method includes first inserting a needle of a microphone housing within the tree. The method continues with monitoring, with the microphone, an audio window and detecting, within the audio window, a plurality of overlapping audio sub-windows. The method then calculates a mel spectrogram from the plurality of overlapping audio sub-windows where the mel spectrogram includes a matrix of features. A trained neural network is used to determine, based on the mel spectrogram that the tree has an insect infestation.

Further embodiments, the apparatus includes a GPS module or other location identification mechanism coupled to the processing unit. The processing unit receives location information from the GPS module or other location identification mechanism and appends the location information to the tree information.

In further embodiments, the needle is 40 mm in length and 3 mm in thickness.

In further embodiments, the mel spectrogram utilizes 32 mel bands.

In further embodiments, the audio window is 2.5 s long and each of the plurality of overlapping audio sub-windows is 30 ms long, overlapping the previous sub-window by 20 ms.

In further embodiments, the indication of an insect being present is determined using a convolutional neural network (CNN).

In further embodiments, the CNN includes a combination of 2 dimensional (2D) convolution, one dimensional convolution, maximum value over a window, flatten, or dense layers.

In further embodiments, determining the indication that the tree has an insect infestation includes determining, using the neural network, if each of the plurality of overlapping sub-audio windows includes an indication of an insect being present, and determining that the number of indications of an insect being present exceeds a predetermined threshold.

In further embodiments, the determining that the tree has an insect infestation includes a recurrent neural network (RNN) receiving the mel spectrogram and determining that the tree has an insect infestation.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention provide an automatic portable device for the early detection of insect infestations, such as those caused by red palm weevils (RPW) in palm trees. Detection is done by recording sound or acoustic emissions that insects make while within the tree and assessing the sound using a deep learning neural network (NN) and machine learning techniques. Embodiments include an apparatus including a housing and needle system to enable a microphone to monitor sound within trees. Sound recordings are assessed with a trained deep learning model to detect RPWs.

Embodiments enable the early detection of RPW in all stages of larvae development using an apparatus such as a portable processing unit with an attached microphone housing. The microphone housing includes a needle for insertion into a tree and a housing including a microphone. In embodiments, a piezoelectric microphone may be used. The processing unit may utilize a standard smartphone coupled to the microphone housing through standard interfaces and run applications to receive, digitize, and analyze the recorded sound using a deep learning algorithm. The smartphone application may also provide a user interface to allow an operator to conduct testing and review results.

Figure 1:
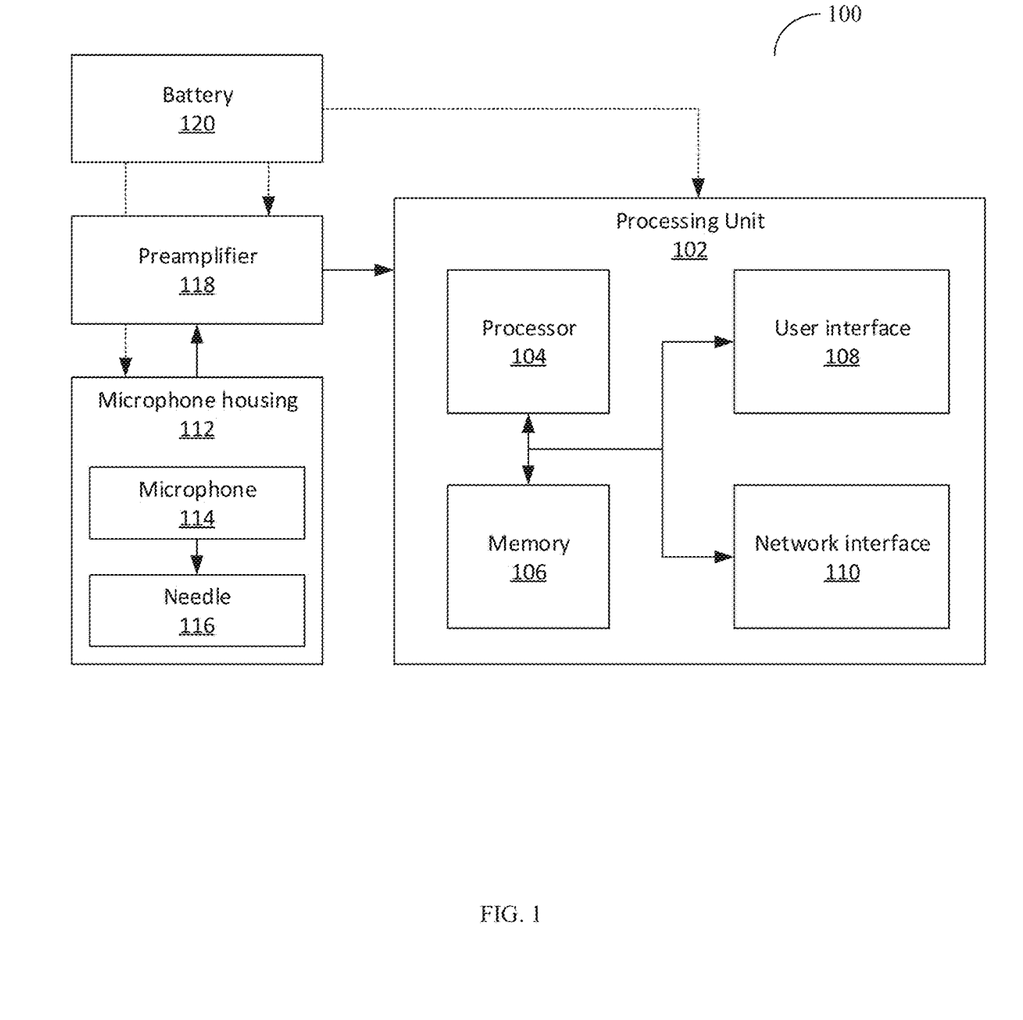
FIG. 1 provides a block diagram of an apparatus to detect insect infestations in a tree, according to an embodiment.

FIG. 1 provides a block diagram of an apparatus 100 to detect insect infestations in a tree, according to an embodiment. Detection apparatus 100 includes three major components, any of which or all of which may be powered by battery 120. Battery 120 may be any suitable battery as known in the art such as a rechargeable lithium-ion battery. Battery 120 may be internal to the processing unit 102, external to the processing unit 102 and the microphone housing 112, or multiple batteries may be used within or external to the processing unit 102 and the microphone housing 112. Microphone housing 112 includes a microphone 114 and a needle 116 for insertion into a tree or other object to be analyzed. Preamplifier 118 receives a sound signal from the microphone 114 and amplifies it to sufficient levels for transmission to processing unit 102. The processing unit 102, which in embodiments may be a smartphone, tablet, laptop computer, or similar portable electronic device. An application program (an "app") is loaded in memory 106 and contains instructions, which cause the processor 104 to perform method as described herein including the functionalities for real-time audio monitoring, detection of RPWs, geotagging, uploading of relevant audio files, and data labelling. Processing unit 102 also includes a user interface 108 with which a user may input commands and configuration information through an input screen, keyboard, keypad, microphone, mouse, trackpad, etc. User interface 108 also provides feedback to the use through a screen, speaker, haptic (vibration) device, etc. Processing unit 102 may also include network interface 110 to allow communications through wireless or wired means to external devices, servers, etc. In embodiments, microphone housing 112, processing unit 102, preamplifier 118, and battery 120 may be incorporated into one or more physically separate housings. Any of microphone housing 112, processing unit 102, preamplifier 118, and battery 120 may also be combined in a single housing, may be removably attached to one another, or may be attached through connectors or cables. In particular, battery 120 may be removably attached to processing unit 102, preamplifier 118, and microphone housing 112 may be a physically separate unit coupled to both the processing unit 102 and battery 120 through a cable of wireless connection.

Figure 2:
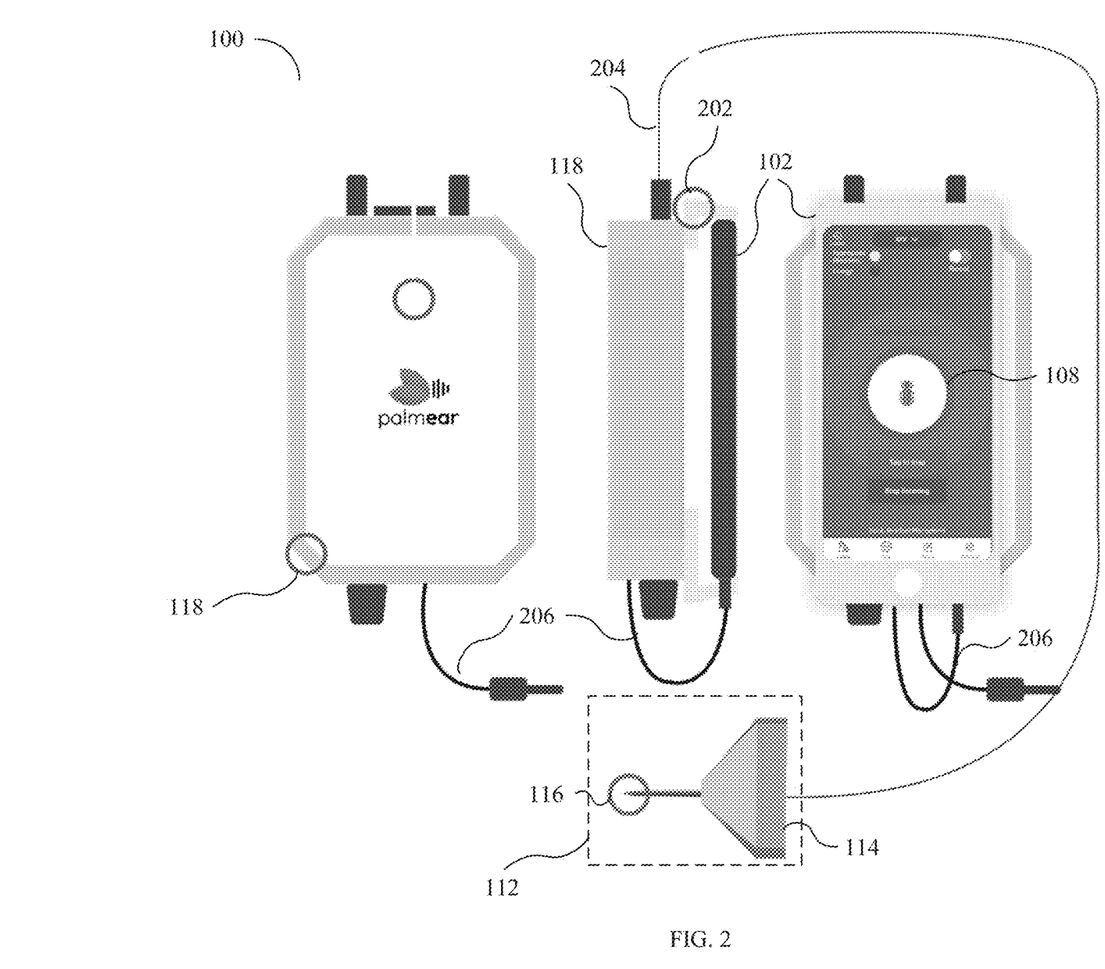
FIG. 2 illustrates a diagram of a smartphone based apparatus to detect insect infestations in a tree, according to an embodiment.

FIG. 2 illustrates a diagram of a smartphone based apparatus to detect insect infestations in a tree, according to an embodiment. The processing unit 102 of this embodiment is a smartphone 102 that includes a processor, memory, a user interface 108, and network interfaces. The smartphone loads an application from memory containing instructions to perform the methods described herein. The smartphone also includes a rechargeable battery but is also coupled to external battery 120, collocated with preamplifier 118, that may provide additional power to the smartphone. The smartphone is physically attached to preamplifier 118 using clasps 202. Preamplifier 118 is of a similar width and height to have a similar footprint to the smartphone. The preamplifier 118 and smartphone processing unit 102 are connected through cable 206. Preamplifier 118 also includes electronic components, such as a battery 120, and interfaces to connect microphone housing 112 to the apparatus 100. Electronic components included with preamplifier 118 may also include any or all of a power switch, a USB or other connector for charging the battery 120, a headphone jack, and indicator lights. Indicator lights may be used to indicate the status of the apparatus, the microphone housing 112, or the battery 120 itself, such as the amount of charge remaining in the battery 120.

Microphone housing 112 includes a brass needle 116 and the housing portion 114 which includes a microphone. In embodiments, the brass needle 116 is 40 mm in length and 3 mm in thickness and is secured within the housing 114 illustrated in FIG. 5A through FIG. 5D. In other embodiments an 80 mm long needle 116 may be used. Vibrations from the RPW sounds or acoustic emissions from within the tree are captured through the needle by the piezoelectric microphone inside the housing 114.

The embodiment of FIG. 2 may be designed so that the electrical parts of the apparatus 100 are protected within a rugged enclosure and may be used to amplify very faint sounds captured through the microphone with very low self-noise and power consumption. The analogue amplified sound is transmitted towards the audio input on the smartphone (for example, an Apple Lightning port) for digital signal processing and AI detection in the mobile app running on the processing unit 102. The amplified sound may be digitized by electronic circuitry either before or after being transmitted to the processing unit 102.

Figure 3:
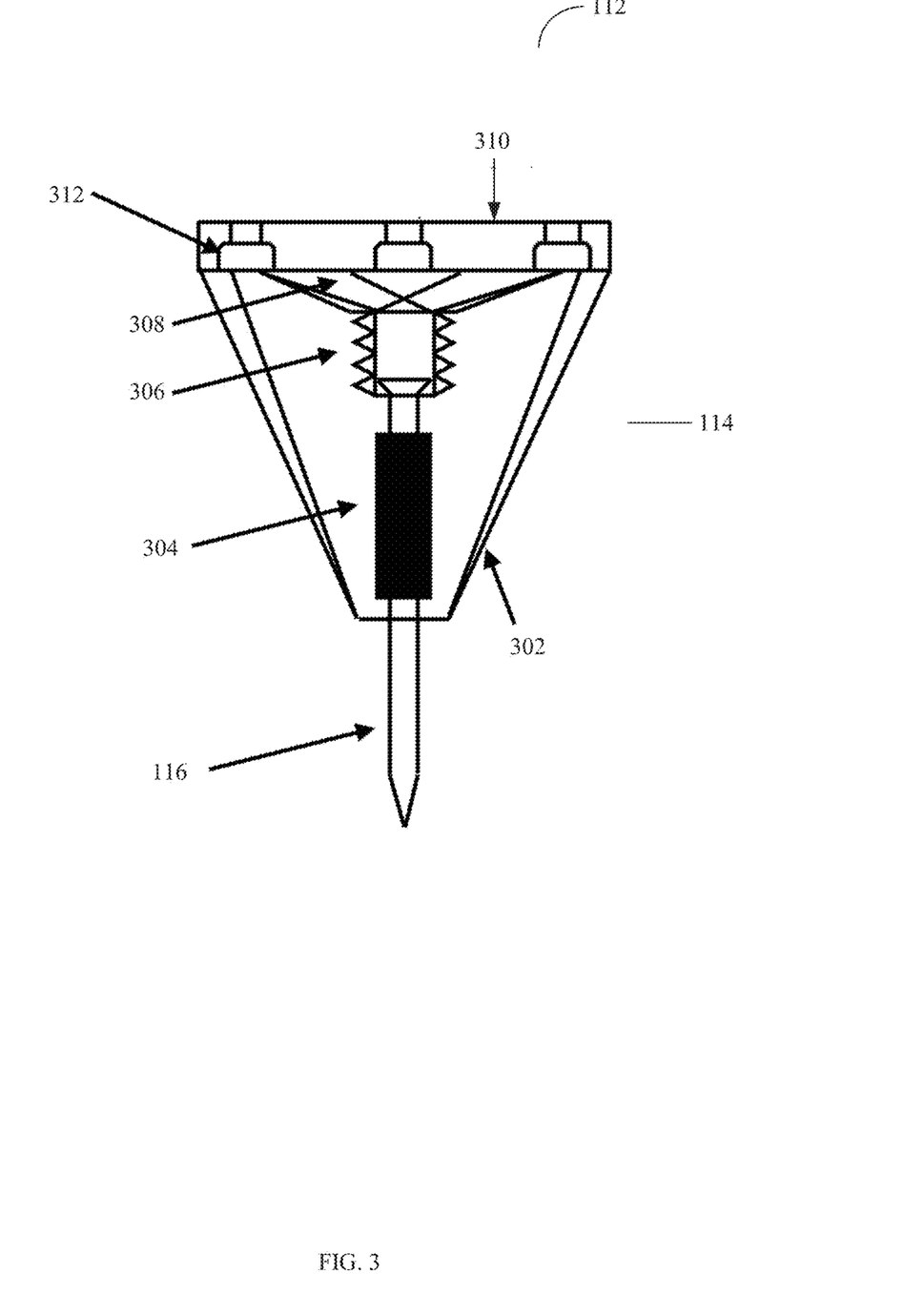
FIG. 3 illustrates components of a microphone housing, according to an embodiment.

FIG. 3 illustrates components of a microphone housing 112, according to an embodiment. Needle 116 may be constructed from brass and ideally will have a high spring constant to enhance sound transmission. In embodiments, needle 116 may have a length between 6 cm and 10 cm and a diameter between 2.5 mm and 4 mm depending on the size and type of tree, plant, or structure to be monitored and the characteristics of the sounds to be measured. Housing 114 is shaped like a three-sided prism with the needle 116 extending from the apex of the prism. Housing 114 may have a two-part structure; a prism shaped housing 302 and a housing cap 310. In embodiments, the prism shaped housing 302 may have a height between 5 cm and 8 cm. The exact dimensions of prism shaped housing 302 may vary and be customized depending on the size and type of tree, plant, or structure to be monitored and the characteristics of the sounds to be measured. Prism shaped housing 302 includes a microphone, such as a piezoelectric microphone, and is secured to the housing cap 310 and may be secured with closures such as hex nuts. The combination of the prism shaped housing 302 and the housing cap 310 may form a sealed chamber 308 to enhance sound conduction by the microphone housing 112. The needle 116 may be secured within the microphone housing 112 via threads 306 and a metallic cylinder 304 which provides additional support for needle 116. In embodiments, a variety of different needles 116 of different dimensions and material may be used, with the most suitable needle being installed within the microphone housing 114 prior to insertion into a tree or other object to be monitored.

In embodiments, with the housing cap 310 removed, the needle 116 may be inserted through the base of the prism shaped housing 302 and screwed into place. The housing cap 310 may then be secured to the prism shaped housing 302 with additional screws.

Figure 4A:
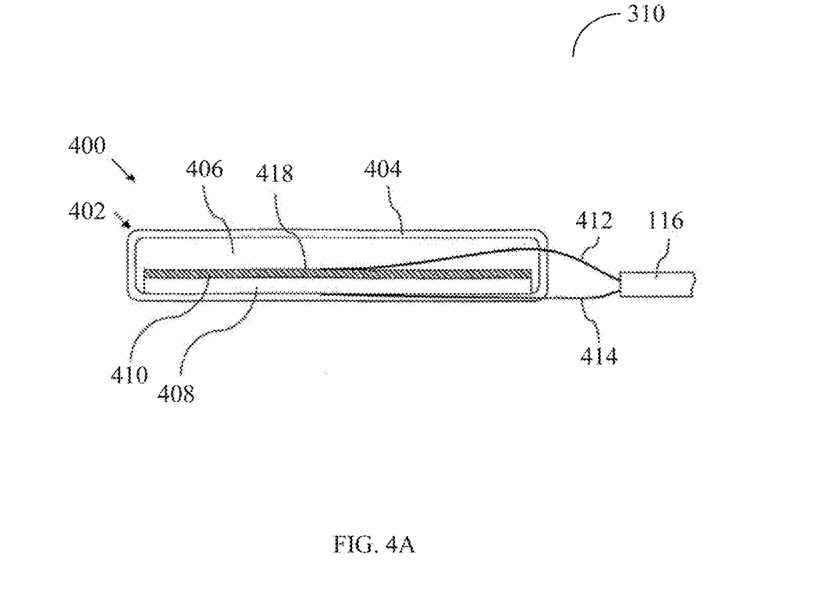
FIG. 4A and FIG. 4B illustrate a piezoelectric microphone for use with a microphone housing, according to an embodiment.
Figure 4B:
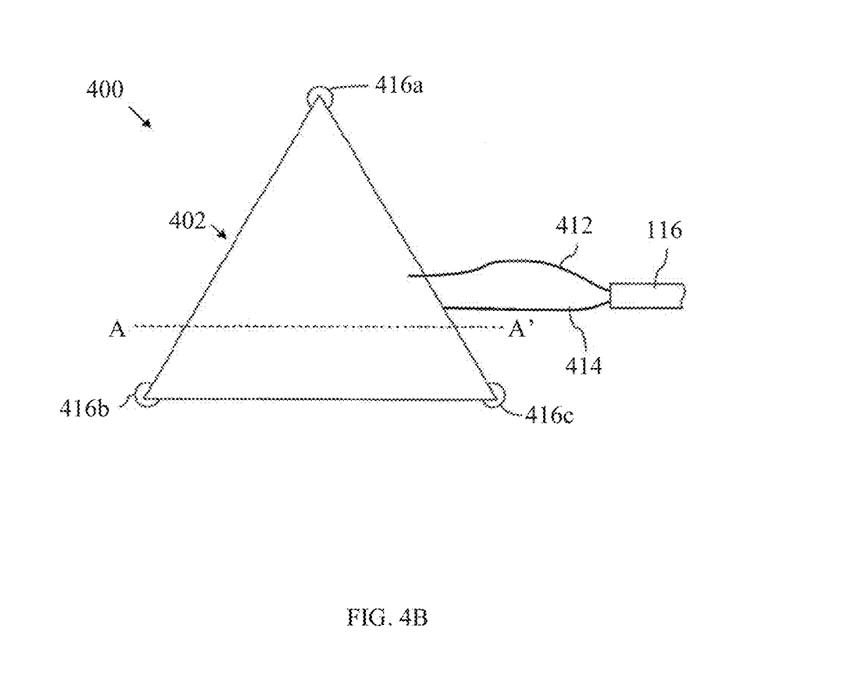

FIG. 4A and FIG. 4B illustrate a piezoelectric microphone 400 incorporated into the prism shaped housing 302, according to an embodiment. FIG. 4A is a cross sectional view of a piezoelectric microphone 400 that may be installed within the base of the prism shaped housing 302. The microphone 400 has a transducer membrane 402 comprising a piezoelectric layer 410 laminated to a metal layer 408. The piezoelectric layer 410 is provided with a conducting electrode layer 418 on the surface that is not in contact with the metal layer 408. Electric conductors 412 and 414 are in electrical contact with the conducting layer 418 and the metal layer 408 respectively and these layers provide that the conductors 412 and 414 are in electrical contact with essentially the whole upper and lower surface of the piezoelectric layer 410, respectively. By this arrangement the sum of the electrical signal produced by the piezoelectric layer 410 over the whole surface is registered when the transducer membrane 402 vibrates. The electric conductors 412 and 414 are preferably connected with respective layer by soldering or another joining method that enables electrical contact between the layer and the conductor. The other ends of the conductors 412 and 414 are put in contact with an audio recording circuitry, such as an audio preamp. Conductors 412 and 414 may be connected to a cable 116, which may be a coaxial cable.

Further, the transducer membrane 402 includes an isolating layer 406, for example a polymer material such as epoxy or the like, and an electrically conducting shielding layer 404 in electrical contact with the metal layer 408 and thus also the conductor 414, but not with the conductor 412. Hence, the conductor 412 is isolated from the shielding layer 404 with a suitable isolator arrangement, e.g., the conductor 412 is provided with an isolating cover. As shown in FIG. 4A, the isolating layer 406 also encloses the outer periphery of at least the piezoelectric layer 410, but preferably also the metal layer 408 whereby the shielding layer 404 can surround essentially the whole transducer membrane 402 without short circuiting the piezoelectric layer 410. The shielding layer 404 lowers the susceptibility to interference caused by electromagnetic waves, for the microphone 400.

As is shown in FIG. 4B, the transducer membrane 402 has an essentially triangular shape, which has been found to provide notably enhanced audio capture/reception.

Figure 5A:
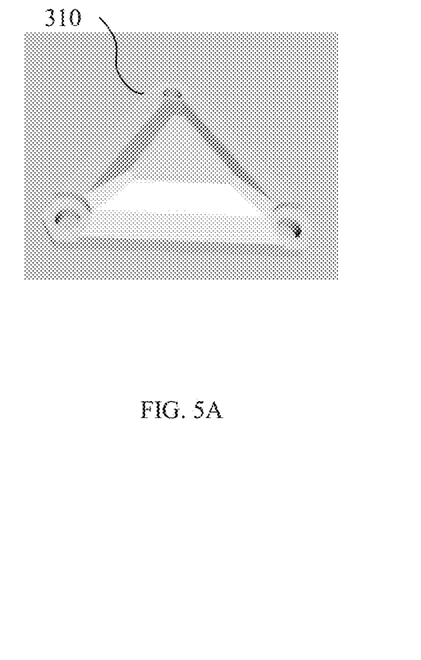
FIGS. 5A through 5D illustrate components of a microphone outer housing, according to an embodiment.
Figure 5B:
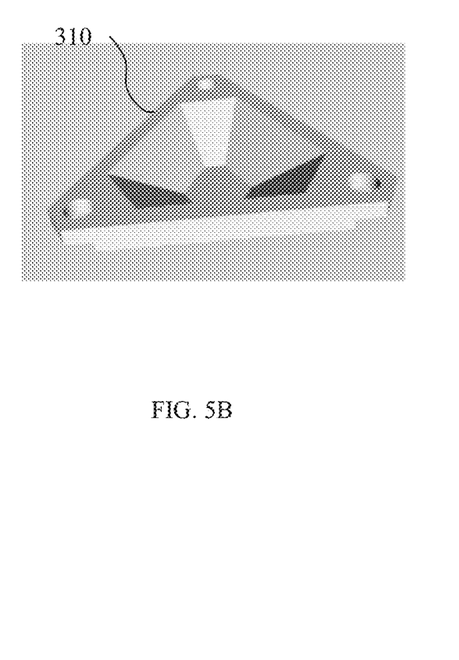
Figure 5C:
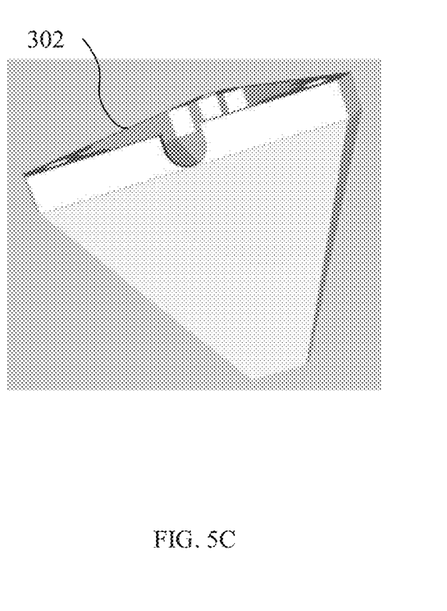
Figure 5D:
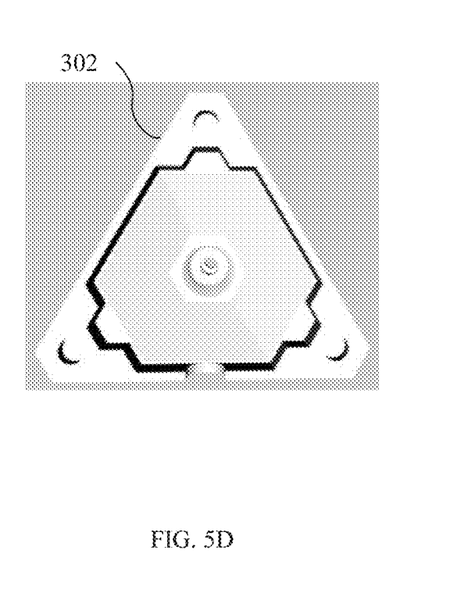

FIGS. 5A through 5D illustrate components of a microphone outer housing, according to an embodiment. FIG. 5A illustrates housing cap 310 with an extruded top to provide sufficient clearance to avoid physical contact with microphone 400. FIG. 5B illustrates the inside surface of housing cap 310. FIG. 5C illustrate prism shaped housing 302 shaped to break incoming sound waves and reduce captured background noise. The placement of the microphone 400 in the prism shaped housing 302 in this way together with the needle 116 provides for single direction audio capture. FIG. 5D illustrates the placement of microphone 400 within the base of the prism shaped housing 302. Microphone 400 is secured on the edges of the prism shaped housing 302 which enables only three points of contact with the transducer membrane. The microphone 400 is therefore freely hanging within the middle of the base of the prism shaped housing 302 allowing it to mainly catch vibrations from the direction of the tree.

In order to utilize the apparatus to monitor trees for early signs of infestation, the processing unit 102 is loaded with the monitoring application and the apparatus 100 including processing unit 102, microphone housing 112, preamplifier 118, and battery 120 is assembled. (Note that in some embodiments, battery 120 may be optional.) A needle 116, suitable for the tree to be monitored, is installed within the microphone housing 112. In order for vibrations to be transmitted through the palm tissue, the needle 116 should be inserted in the base of a branch or in the tree bark. The branch should be succulent and well attached to the tree and the needle 116 should not be inserted through a part of the palm tree trunk covered in fiber, or other suitable position. If necessary, "hair" at the point of insertion may be removed and then the needle 116 may be inserted into the tissue of the branch after a calm down time of approximately 15 s. Microphone housing 114 should not touch any recurring palm hair or any external objects. The closer the needle is to the core of the tree (base of the branch) the larger the detection radius will be. In some types of trees, multiple measurements should be made approximately ever 40 cm from the base of the tree. Or multiple measurements can be taken to find the possible infestation location inside the same tree. In other types of trees, only a single measurement at the crown may suffice.

Figure 6:
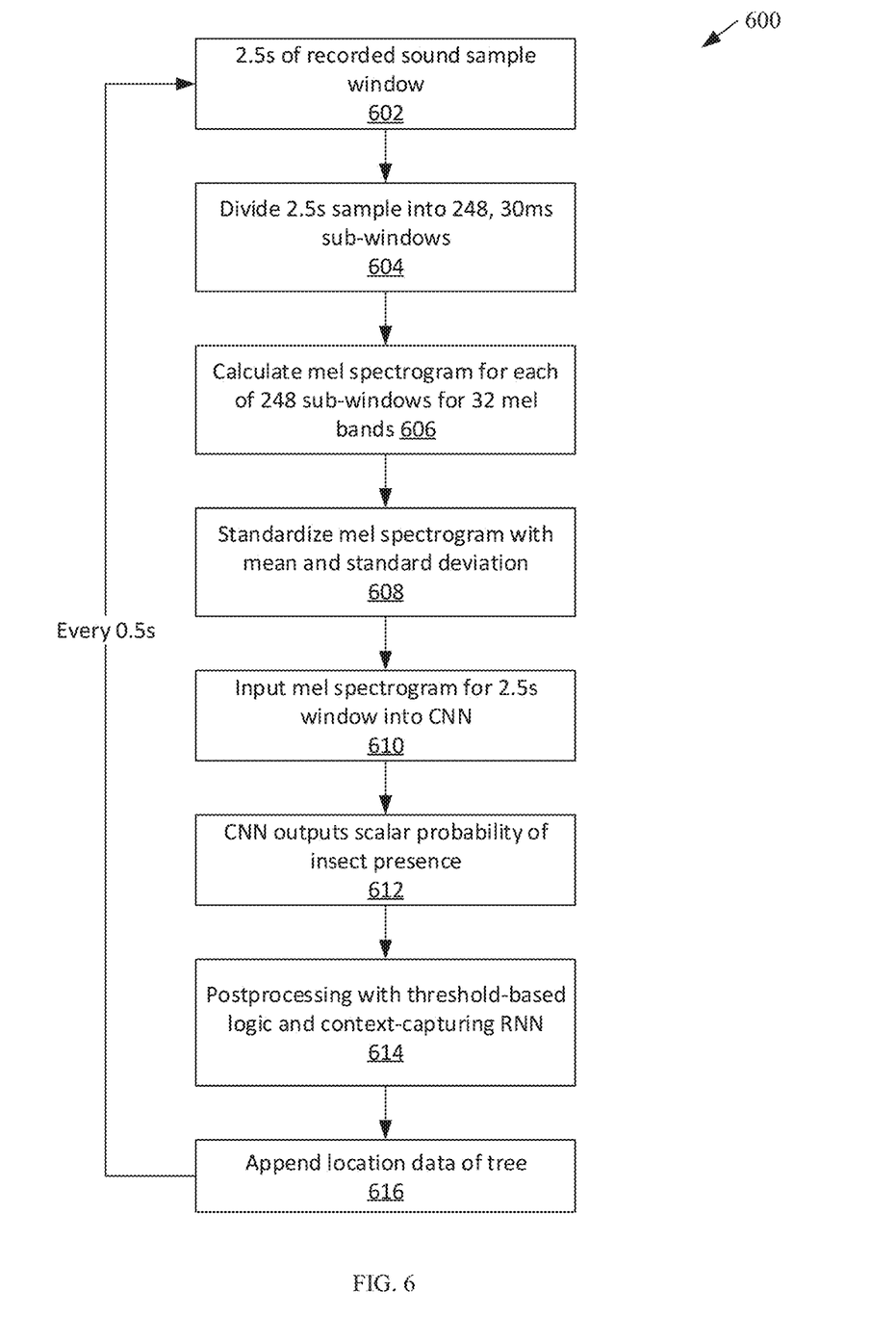
FIG. 6 illustrates a method of use of an apparatus to detect insect infestations in a tree, according to an embodiment.

FIG. 6 illustrates a method 600 of use of an apparatus to detect insect infestations in a tree, according to an embodiment. Once the needle 116 is inserted into a tree at a location method 600 may be performed in order to obtain an audio sample and analyze it for infestations. Audio information is continuously recorded and digitized. In step 602, the previous window of 2.5s of sound is recorded as an audio window. Step 602 is repeated every 0.5 s which leads to overlapping audio windows of 2.5s each. Recordings may be made using a 44.1 kHz sampling rate. The process of step 602 is further described with respect to FIG. 7, below. In step 604, each 2.5 s audio window is divided into 248 sub-windows, each 30 ms long, and each sub-window overlapping each other by 20 ms as described in detail in FIG. 8, below. In step 606, each sub-window is used as an input to calculate a mel spectrogram from the data, yielding a matrix of features of dimensions 248×32 (248 sub-windows times 32 mel bands). As in known in the art, a mel spectrogram provides a power spectrum shaped by psychoacoustic principles. In embodiments, other psychoacoustic analysis techniques may also be used. In step 608, the features in every mel band are then standardized with mean and standard deviation gained from the training process. In step 610 the mel spectrogram is used as an input to a convolution neural network (CNN) for deep learning detection. The trained CNN, which may include a combination of functions including 2 dimensional (2D) convolution, one dimensional (1D) convolution, maximum value over a window, flatten, or dense layers, receives the extracted mel spectrogram as an input for classification. In step 612, for every 2.5 s window of data, the CNN outputs a scalar value between 0 and 1, giving the probability of the 2.5s sample containing RPW sounds. In embodiments, 0 is the complete certainty of no RPW sounds, while 1 means full certainty that the 2.5s sample contains RPW sounds. In embodiments, the output scalar value, is compared with a threshold, such as 0.75. If the scalar value is below the threshold, it is determined that the audio window does not contain an RPW sound, and vice versa. In step 614, postprocessing of results occurs. The processing of each 2.5 s window is done in real time and gives an indication of RPW sounds from within the tree. However, in order to accurately label the tree as infested, processing of multiple windows may be required. In embodiments, the sum of positive detections (audio windows likely to contain RPW sounds) in a 30 s to 50 s period (including 60 to 100 audio windows) may be compared to a fixed threshold. If there are more than 45 positive detections in that period (out of 100), the tree is labeled as infested. If the sum is between 35 and 45, it is labeled as suspicious, and a subsequent test may be required.

In embodiments, a recurrent neural network (RNN) may be used to implement steps 610, 612, and 614. The RNN may receive the mel spectrogram outputs from step 608 for the approximately 60 to 100 audio windows and analyze them to make a determination whether a tree is infested.

In embodiments, external vibrations caused by movement of the apparatus, needle, or cables, sounds caused by the insertion of needle 116 into a tree, and other anomalies may cause false or inaccurate sound readings. Method 600 may track the sound energy over time to detect anomalies and reset the state of the algorithm (e.g., reset the number of positive sub-windows to 0) to prevent detection errors. Method 600 may then restart, collect further 2.5s audio windows, or discarding audio windows in order to produce accurate results.

In embodiments, the CNN undergoes a machine learning training process before a new deep learning model is deployed for detection in step 610. The training process consists of feeding a dataset of recordings containing RPW sounds, labeled as positive, and recordings not containing RPW sounds, labeled as negative, into a neural network learning scheme. In embodiments, the robustness of the neural network model may be increased by introducing L2 regularization and dropout mechanisms during the training process. The trained neural network is then tested with the test recordings in order to assess the quality of results. This process is continuously iterated with new recordings, neural network architectures and feature extraction mechanisms until sufficiently accurate and robust results are obtained.

Figure 7:
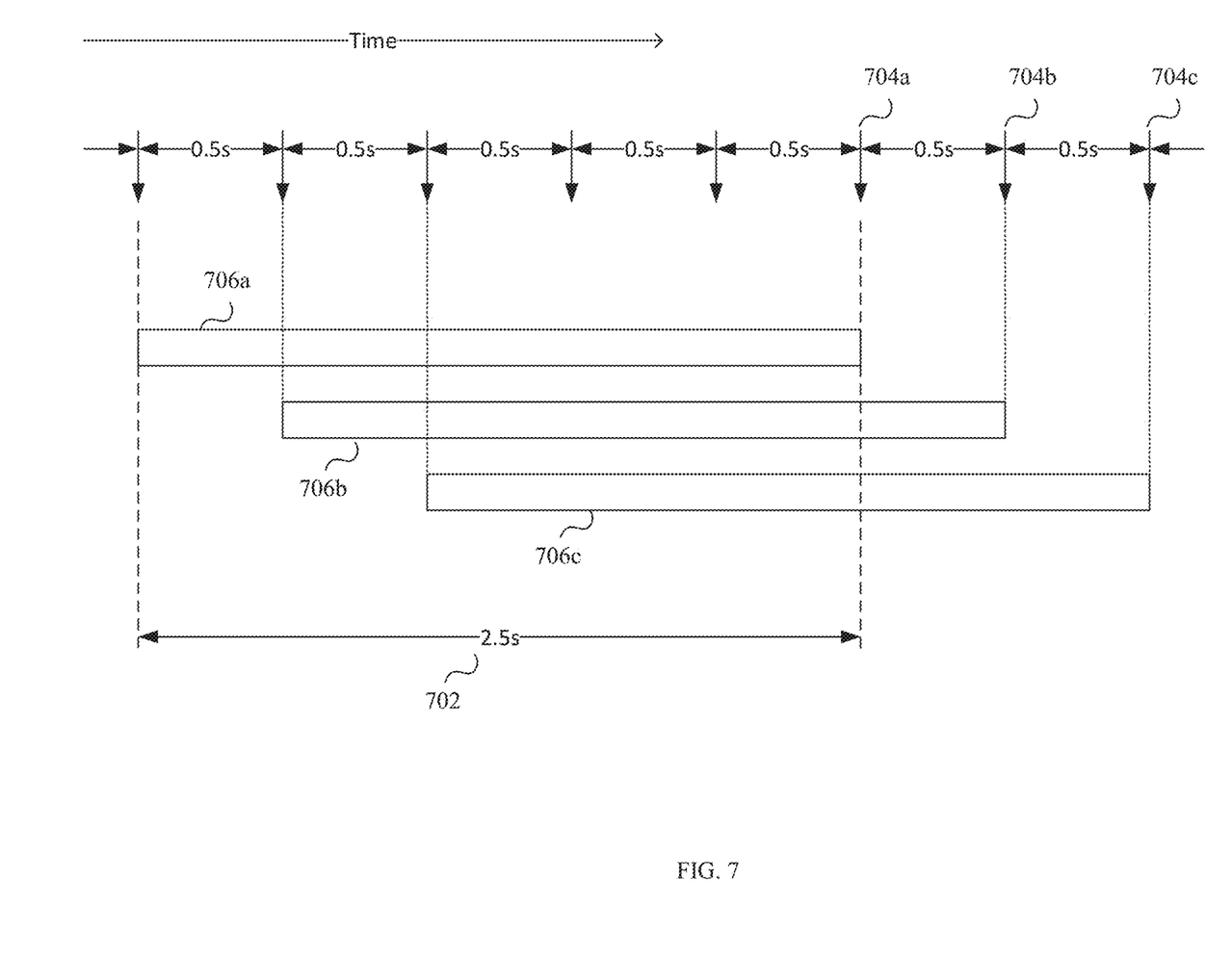
FIG. 7 illustrates how audio windows can be extracted from a recorded sound, according to an embodiment.

FIG. 7 illustrates how audio windows can be extracted from recorded sound as is done in step 602, according to an embodiment. Microphone 400 records sound received from needle 116. Every 0.5 s, a 2.5s of sound 702 is captured as an audio window 706a, 706b, 706c, etc. At time 704a, 2.5s window 706a is captured. At time 704b, 2.5s window 706b is captured. At time 704c, 2.5s window 706c is captured.

Figure 8:
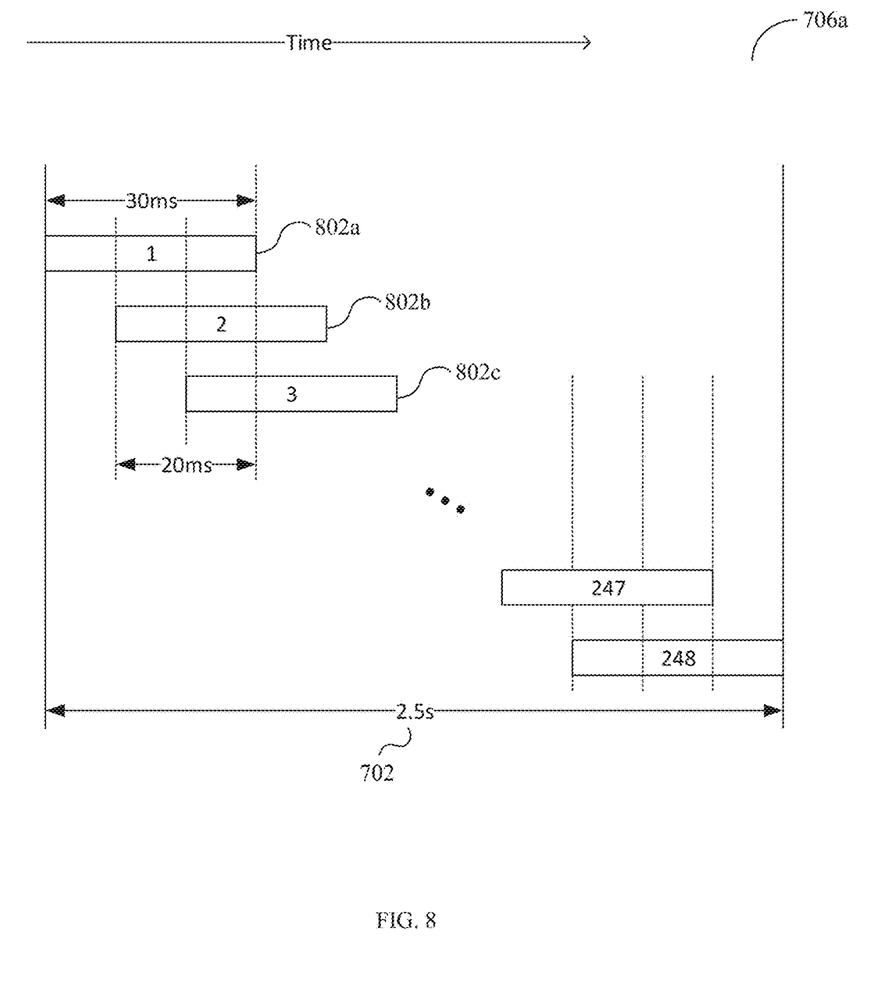
FIG. 8 illustrates how audio sub-windows are extracted from an audio window, according to an embodiment.

FIG. 8 illustrates how audio sub-windows are extracted from an audio window, according to an embodiment. Audio windows recorded in step 602 are further divided into sub-windows 802a, 802b, . . . of 30 ms each in step 604. Window 706a, of 2.5s is divided into 248 sub-windows of 30 ms each, with each sub-window overlapping the previous one by 20 ms. Therefore, the 248 sub-windows are spaced ms apart in time. In embodiments, the length of each sub-window, the overlap between consecutive sub-windows, and the number of sub-windows may be varied without deviating from the teachings contained herein.

Figure 9:
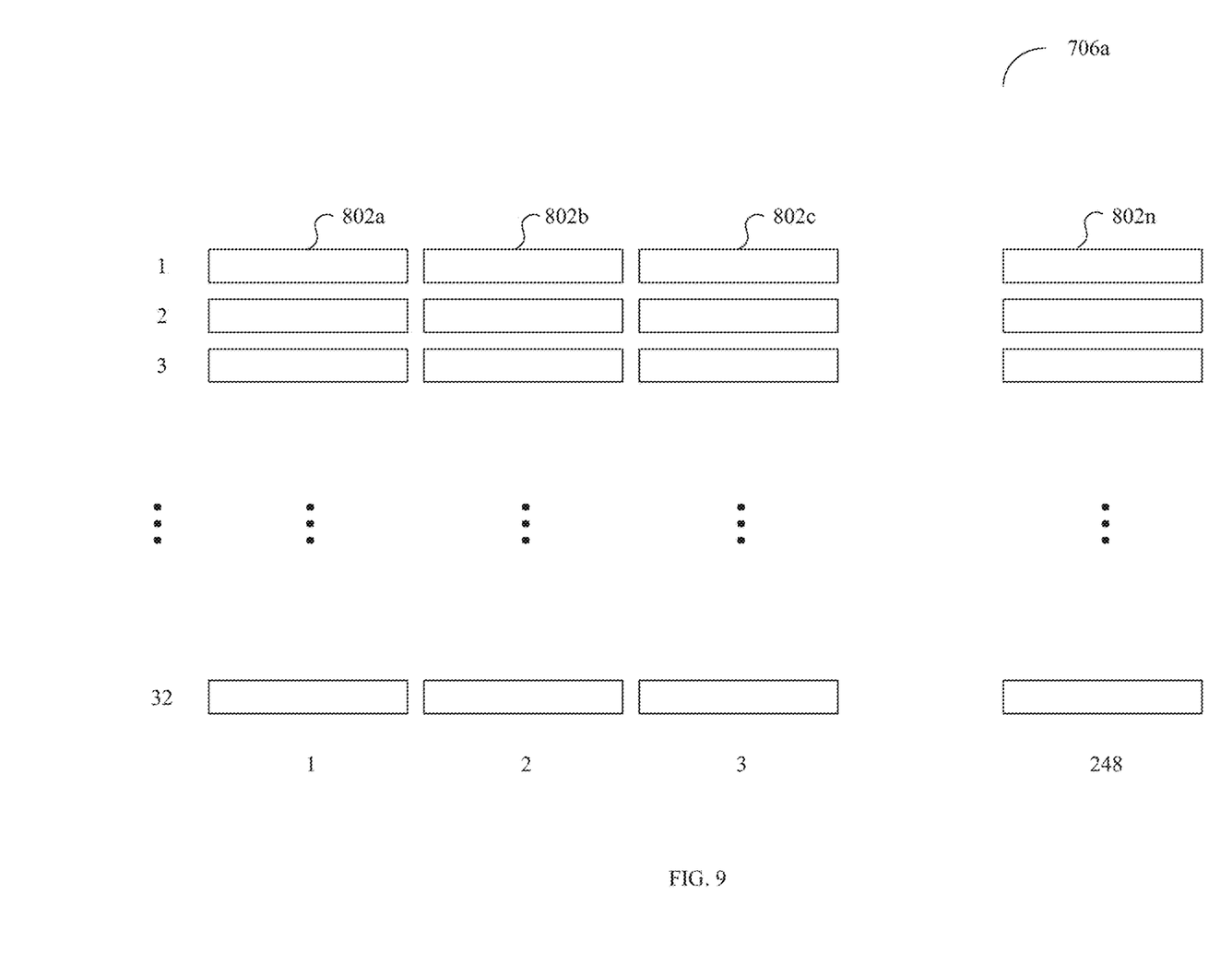
FIG. 9 illustrates how a mel spectrogram is generated for input to a convolution neural network (CNN), according to an embodiment.

FIG. 9 illustrates how a psychoacoustic analysis technique, such as a mel spectrogram, is used to generated input to a convolution neural network (CNN), according to an embodiment. In step 606, each of the 248, 30 ms sub-windows are used to calculate a mel spectrogram of each of 32 mel band. In embodiments, other psychoacoustic techniques, including mel frequency cepstral coefficients, perceptual wavelet packets, gammatone cepstral coefficients, perceptual linear prediction coefficients, auditory salience map, and multiscale spectro-temporal modulations, may be used in place of a mel spectrogram.

In embodiments, processing unit 102 includes a global positioning system (GPS) module that records to position of the apparatus 100. This may be used to determine the location of each tree tested. The location of each tree may be recorded, annotated on a map, appended to a data record for that tree, or otherwise recorded. A history of the infestation status of each tree may also be recorded. Providing a GPS location of analyzed and infected trees can be a vital feature when implementing a usable system that provides a user with an overview of a specific area or location.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations, or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. An apparatus for monitoring sounds from within a tree, the apparatus comprising:
   a microphone housing including a needle coupled to a microphone, the microphone recording a sound detected by the needle while inserted within the tree; and
   a processing unit coupled to the microphone housing, the processing unit including a processor and a memory, the memory storing non-transitory computer readable instruction that when executed by the processor cause the processor to:
   record, with the microphone, an audio window;
   detect, within the audio window, a plurality of overlapping audio sub-windows;
   calculate a mel spectrogram from the plurality of overlapping audio sub-windows,
   the mel spectrogram including a matrix of features;
   determining, using a neural network, if each of the plurality of overlapping sub-audio windows includes a number of indications of an insect being present; and
   determining that the number of indications of the insect being present in the plurality of overlapping audio sub-windows exceeds a predetermined threshold, and indicating that the tree has an insect infestation.

2. The apparatus of claim 1 further comprising a GPS module or other location identification mechanism coupled to the processing unit, the processing unit receiving location information from the GPS module or the other location identification mechanism and appending the location information to tree information.

3. The apparatus of claim 1 wherein the needle is 40 mm in length and 3 mm in thickness.

4. The apparatus of claim 1 wherein the mel spectrogram utilizes 32 mel bands.

5. The apparatus of claim 1 wherein the audio window is 2.5s long and each of the plurality of overlapping audio sub-windows is 30 ms long, overlapping the previous sub-window by 20 ms.

6. The apparatus of claim 1 wherein the indication of an insect being present is determined using a convolutional neural network (CNN).

7. The apparatus of claim 6 wherein the CNN includes a combination of 2 dimensional (2D) convolution, one dimensional convolution, maximum value over a window, flatten, or dense layers.

8. The apparatus of claim 1 wherein the determining that the tree has an insect infestation comprises a recurrent neural network (RNN) receiving the mel spectrogram and determining that the tree has an insect infestation.

9. A method of detecting insect infestations within a tree, the method comprising:
   inserting a needle of a microphone housing within the tree, the microphone housing including a microphone coupled to the needle;
   recording, with the microphone, an audio window;
   detecting, within the audio window, a plurality of overlapping audio sub-windows;
   calculating a mel spectrogram from the plurality of overlapping audio sub-windows, the mel spectrogram including a matrix of features;
   determining, using a neural network, if each of the plurality of overlapping sub-audio windows includes an indication of an insect being present; and
   determining that the number of indications of the insect being present in the plurality of overlapping audio sub-windows exceeds a predetermined threshold, and indicating that the tree has an insect infestation.

10. The method of claim 9 further comprising reading location information from a GPS module or other location identification mechanism and appending the location information to tree information.

11. The method of claim 9 wherein the needle is 40 mm in length and 3 mm in thickness.

12. The method of claim 9 wherein the mel spectrogram utilizes 32 mel bands.

13. The method of claim 9 wherein the audio window is 2.5s long and each of the plurality of overlapping audio sub-windows is 30 ms long, overlapping the previous sub-window by 20 ms.

14. The method of claim 9 wherein the indication of an insect being present is determined using a convolutional neural network (CNN).

15. The method of claim 14 wherein the CNN includes a combination of 2 dimensional (2D) convolution, one dimensional convolution, maximum value over a window, flatten, or dense layers.

16. The method of claim 9 wherein the determining that the tree has an insect infestation comprises a recurrent neural network (RNN) receiving the mel spectrogram and determining that the tree has an insect infestation.

* * * * *